US010139493B1

(12) United States Patent
Chamberlain et al.

(10) Patent No.: US 10,139,493 B1
(45) Date of Patent: Nov. 27, 2018

(54) ROTOR SAFETY SYSTEM

(71) Applicant: Near Earth Autonomy, Inc., Pittsburgh, PA (US)

(72) Inventors: Lyle Chamberlain, Pittsburgh, PA (US); Sanjiv Singh, Pittsburgh, PA (US); Adam Stambler, Pittsburgh, PA (US); Hugh Cover, Pittsburgh, PA (US); Bradley Hamner, Pittsburgh, PA (US)

(73) Assignee: NEAR EARTH AUTONOMY, INC., Pittsburgh, PA (US)

( * ) Notice: Subject to any disclaimer, the term of this patent is extended or adjusted under 35 U.S.C. 154(b) by 0 days.

(21) Appl. No.: 15/642,744

(22) Filed: Jul. 6, 2017

Related U.S. Application Data (60) Provisional application No. 62/358,727, filed on Jul. 6, 2016.

(51) Int. Cl.
| | | |
|---|---|---|
| *G01S 17/93* | (2006.01) | |
| *B64C 27/00* | (2006.01) | |
| *G01S 17/02* | (2006.01) | |
| *G01S 19/13* | (2010.01) | |
| *B64C 27/06* | (2006.01) | |

(52) U.S. Cl.
CPC .......... *G01S 17/933* (2013.01); *B64C 27/006* (2013.01); *B64C 27/06* (2013.01); *G01S 17/023* (2013.01); *G01S 19/13* (2013.01)

(58) Field of Classification Search
USPC .......................................................... 701/3
See application file for complete search history.

(56) References Cited

U.S. PATENT DOCUMENTS

| | | | |
|---|---|---|---|
| 5,371,581 A | 12/1994 | Wangler et al. | |
| 9,417,325 B1 * | 8/2016 | Bry | ...................... G01S 13/9303 |
| 9,557,742 B2 | 1/2017 | Paduano | |
| 2010/0299067 A1 | 11/2010 | McCollough et al. | |
| 2011/0006943 A1 * | 1/2011 | Shaffer | .................. G01S 17/933 |
| | | | 342/146 |
| 2016/0125746 A1 * | 5/2016 | Kunzi | ................... G05D 1/0088 |
| | | | 701/11 |
| 2016/0335901 A1 | 11/2016 | Singh et al. | |

OTHER PUBLICATIONS

Cao et al., "Assessment of helicopter brownout with a scanning lidar," CLEO Technical Digest, pp. 1-2 (2012).
Scherer et al., "Autonomous landing at unprepared sites by a full-scale helicopter," Robotics and Autonomous Systems, pp. 1-18 (2012).
Scherer et al., "First Results in Autonomous Landing and Obstacle Avoidance by a Full-Scale Helicopter," 2012 IEEE International Conference on Robotics and Automation (ICRA), pp. 951-956 (2012).

* cited by examiner

*Primary Examiner* — Tyler D Paige
(74) *Attorney, Agent, or Firm* — K&L Gates LLP (57) ABSTRACT

Piloted or autonomous rotorcraft includes a rotor safety system. The rotor safety system comprises a lidar scanner toward a rotor of the rotorcraft, e.g., the tail rotor, that scans the 3D space in the vicinity of the rotor. Objects in the vicinity of the rotor are detected from the lidar point data. In a piloted rotorcraft, predictive warnings can be provided to the helicopter's flight crew when a detected object presents a hazard to the rotor of the rotorcraft.

26 Claims, 7 Drawing Sheets

ROTOR SAFETY SYSTEM

PRIORITY CLAIM

The present application claims priority to U.S. provisional patent application Ser. No. 62/358,727, entitled "Tail Rotor Safety System," filed Jul. 6, 2016, which is incorporated herein by reference in its entirety.

BACKGROUND

Many helicopters include tail rotors at the rear, or tail, of the helicopter. Helicopter flight crews must exercise care during take-off and landing of the helicopter to make sure that the various rotors, including the tail rotor, do not strike objects in the vicinity of the helicopter.

SUMMARY

In one general aspect, the present invention is directed to a helicopter or other rotorcraft with a rotor safety system. The rotor that is monitored can be the tail rotor or another rotor of the helicopter, such as the main rotor. The rotor safety system can comprise a lidar scanner that scans the 3D space in the vicinity of the rotor of the helicopter. Objects in the vicinity of the rotor are detected from the lidar point data. The rotor safety system can be used for both piloted and autonomous helicopters. With piloted helicopters, predictive warnings can be provided to the helicopter's flight crew when a detected object presents a hazard to the tail portion or the main rotor system of the helicopter. For autonomous helicopters, the detected hazards can be provided to other systems of the autonomous helicopter, such as a landing zone evaluation system and/or a flight planning system.

FIGURES

Various embodiments of the present invention are described herein by way of example in connection with the following figures, wherein.

DESCRIPTION

Figure 1:
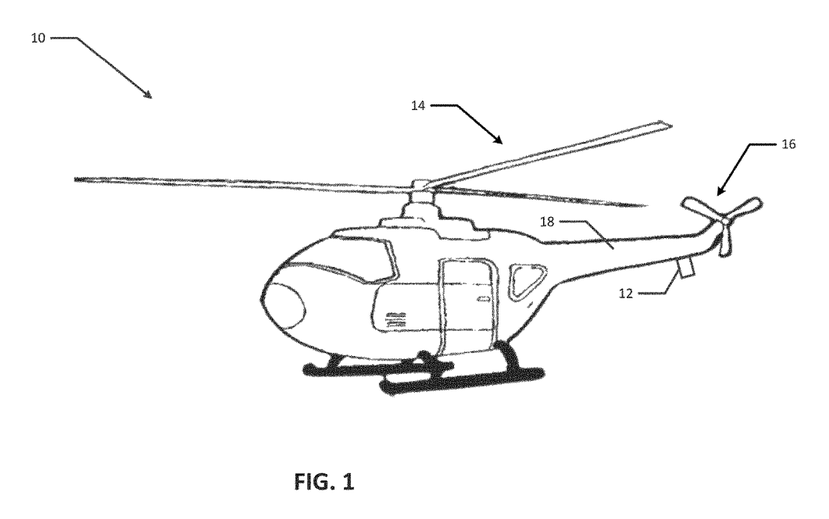
FIG. 1 is diagram of a helicopter with a rear lidar scanning system.

With reference to FIG. 1, in one general aspect the present invention is directed to a helicopter 10 or other type of rotorcraft that includes a lidar sensing system 12. The helicopter 10 could comprise a main rotor 14 and a tail rotor 16 at the distal end of a tail portion 18 of the helicopter 10. In various embodiments, the lidar sensing system 12 can be mounted to observe the space around one or rotors of the helicopter, such as the tail rotor or the main rotor. If used for the tail rotor, the lidar scanning system 12 could be mounted on the tail portion 18 or otherwise near the tail rotor 16 as shown in the example of FIG. 1 so that objects near the tail portion 18 can be detected. Further, the lidar sensing system 12 could be mounted under the tail portion 18 and/or tail rotor 16 so that the tail portion 18 and tail rotor 16 do not severely obstruct the view of the lidar sensing system 12 below the helicopter 10. In other embodiments of the present invention, the lidar sensing system 12 could be placed at other locations on the helicopter besides the tail rotor to monitor other rotors, e.g., the main rotor. The rotor safety system can be used for both piloted and autonomous helicopters.

In the description to follow, it is assumed that the lidar sensing system 12 is used to monitor the tail rotor 16 of the helicopter 10. It should be recognized that the present invention is not so limited and that in other embodiments, the lidar sensing system 12 could be used to monitor the main rotor 14, for example, in which case the lidar sensing system 12 should scan the space around the main rotor 14.

The lidar sensing system 12 detects objects in the vicinity of the helicopter 10 by measuring their distance from the lidar sensing system 12 (and hence the helicopter 10) by illuminating the objects with laser light. In one embodiment, the lidar laser system 12 may comprise several channels (e.g., 16 or 32) that scan a 360° horizontal field of view, with about a 30° to 40° vertical field of view, that scans 5 to 20 times per second (for example), thereby collecting hundreds of thousands (e.g., 300,000) lidar data points per second, with a measurement range of about 100 meters and an accuracy of about 2 cm or less. The lidar sensing system 12 could be implemented with a Velydyne® HDL-32E model lidar sensor, for example, or other suitable lidar scanner with suitable range, bandwidth, and field of view.

Figure 2:
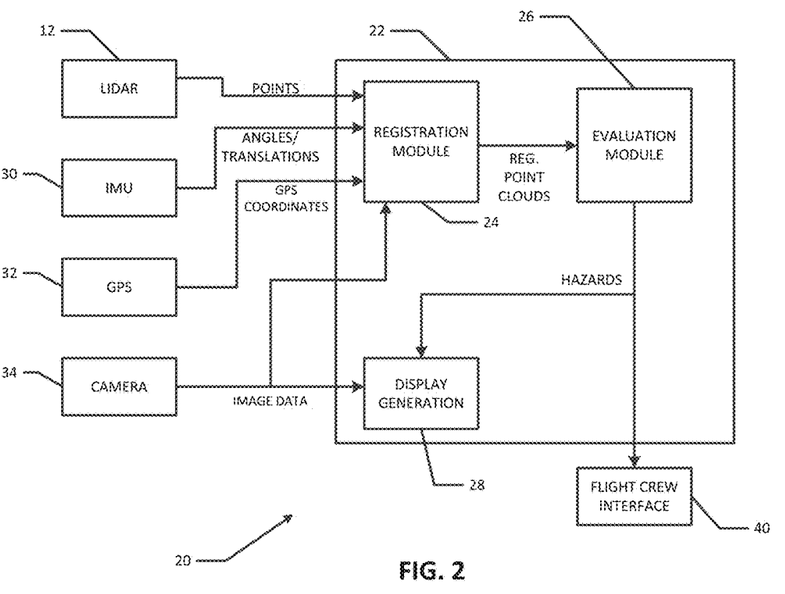
FIG. 2 is a block diagram of a tail rotor safety system according to various embodiments of the present invention.

FIG. 2 is a block diagram of the helicopter's tail rotor safety system 20 according to various embodiments for a piloted helicopter. As shown in FIG. 2, the tail rotor safety system 20 includes an on-board computer system 22 that is included on or with the helicopter 10. The on-board computer system 22 may comprise one or a number of networked computer devices, such as personal computers, laptop computers, servers, etc. The on-board computer system 22 comprises one or more processors and one or more memory units. The memory units may store software or instructions that are executed by the processor(s). The memory units may comprise primary computer memory, such as RAM or ROM, and/or secondary computer memory, such as diskettes, compact discs of both read-only and read/write varieties, optical disk drives, hard disk drives, solid state drives, or any other suitable form of secondary storage. The on-board computer system 22 may include several functional modules, including a registration module 24, an evaluation module 26, and a display generation module 28. The modules may be implemented as software code stored in a memory unit(s) of the on-board computer system 22 that is executed by a processor(s) of the on-board computer system 22. Generally, the registration module 24 registers the point data from the lidar sensing system 12 into a 3D space (such as a global 3D space based on geo-registration or local 3D space relative to the craft) based on position data from one or more other sensor systems of the helicopter 10. The evaluation module 26 detects object in the registered point clouds and determines whether the objects present hazards to the helicopter. The display generation module 28 can generate graphical views of the vicinity of the tail portion of the helicopter that can be displayed on a monitor for the helicopter's flight crew. Additionally or alternatively, it can also generate other cues for the crew, such as audible warnings, etc.

As mentioned above, the registration module 24 registers the point data from the lidar sensing system 12 into the 3D space based on position data from one or more other sensor systems of the helicopter 10. As shown in FIG. 2, those other sensor systems can include an inertial measurement unit (IMU) 30, a GPS system 32, and/or a camera system 34. The IMU unit 30 can include accelerometers, gyroscopes, and/or magnetometers. The IMU's accelerometer system may include a three-axis accelerometer and the gyroscope can detect three-axis angular acceleration around the X, Y and Z axes, enabling accurate calculation of roll ($\varphi$), pitch ($\theta$), and yaw ($\psi$) rotations of the helicopter 10. The IMU 30 can use the combined data from the accelerometer, gyroscope and/or magnetometer to calculate detailed and precise information about the helicopter's six-axis movement in space (e.g., 6, 12 or 15 degrees of freedom). The three axes of the gyroscope combined with the three axes of the accelerometer can enable the IMU 30 to recognize approximately how far, fast, and in which direction it (the IMU 30, and hence the helicopter 10) has moved in space.

Figure 3:
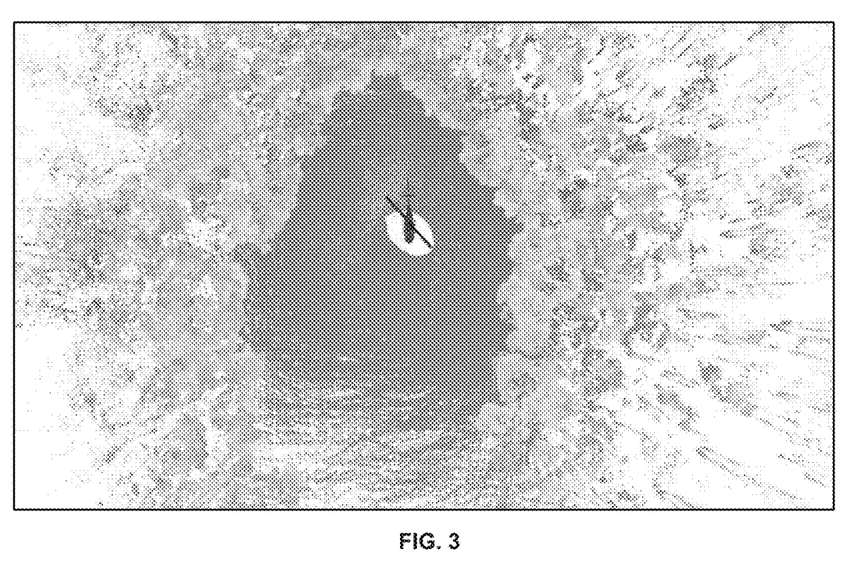
FIG. 3 illustrates an example point cloud.

In various embodiments, the registration module 24 of the on-board computer system 22 registers the lidar point data from the lidar sensing system 12 based on the inputs from the IMU 30. That is, the registration module 24 can continuously update in real-time the estimated position and orientation (pose) of the helicopter 10 based on the angle and translation measurements from the IMU 30. The registration module 24 can then register the time-stamped lidar data from the lidar sensing system 12, by determining where each lidar point data measurement belongs in the 3D space, based on the time-stamped pose estimations for the helicopter 10, to generate a registered point cloud. An example of a graphical representation of a point cloud is provided in FIG. 3 for illustrative purposes. Where the helicopter includes a GPS receiver 32, the geo-registration of the lidar point data can be performed based on the GPS coordinates.

One drawback of many currently available IMUs is that their measurements tend to drift significantly over time, some more than others depending on their accuracy. The deleterious effect of the drift, however, can be reduced by only using the IMU data from short time periods in the tail safety process, so that the drift does not have time to accumulate to unacceptable levels, such as the relatively short time periods for take-off and landing of the helicopter 10. In various embodiments, the registered point clouds from these relatively brief time periods can be sufficiently accurate and rich to provide the helicopter flight crew with meaningful feedback and information about the hazards for the tail rotor of the helicopter 10.

In various embodiments the helicopter 10 could also include a camera system 34, with the captured image data from the camera system 34 being used in geo-registering the lidar point data. For example, U.S. provisional patent application Ser. No. 62/307,061, entitled "Laser Scanner with Real-Time, Online Ego-motion Estimation," filed Mar. 11, 2016 (which is incorporated herein by reference in its entirety), discloses and provides details on how to update IMU pose estimates with visual-inertial odometry data for use in geo-registering the lidar point data by the registration module 24 (e.g., generating a registered point cloud). In that connection, the camera system 34, if one is utilized, may comprise one or more cameras that capture image data for the space scanned by the lidar sensor 12. The camera(s) may be RGB cameras, for example, or other type of suitable camera(s). The utilization of such visual-inertial odometry data can increase the accuracy of the registration in comparison to registration with IMU data alone, which may be beneficial in situations where the IMU drift is too great.

The helicopter 10 could also comprise a GPS system 32 that provides to the on-board computer system 22, time-stamped GPS coordinates for the helicopter that can be used in in geo-registering the lidar point data by the registration module 24. In various embodiments, the helicopter 10 only includes a GPS system 32 (without an IMU) for estimating the position of the helicopter 10 and the registration module 24, accordingly, only uses the GPS coordinates from the GPS system 32 to register the lidar point data. In other embodiments, the helicopter 10 could include both the IMU 30 and the GPS system 32, in which case the registration module 24 uses both the IMU and GPS data to register the lidar point data. In still other embodiments, the helicopter 10 could comprise the IMU 30, the GPS system 32, and the camera system 34, and the registration module 24 could use the data and associated uncertainties from each of these systems to determine the helicopter's pose (such as with a Kalman filter) in order to register the lidar point data. The antenna for many currently available GPS systems tend to be relatively expensive to install on a helicopter, so in various embodiments the GPS system 32 could be eliminated, particularly where the IMU alone is sufficient to register the point data, or the IMU and camera system 34 are jointly sufficient to register the point data.

Figure 4:
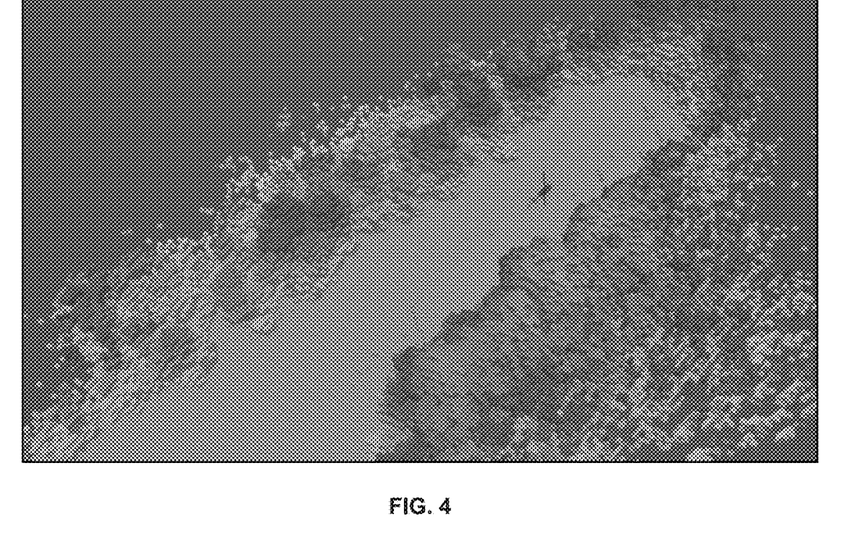
FIG. 4 illustrates an example evidence grid.

The registration module 24 may generate continuously registered point clouds in real-time. The evaluation module 26 may continuously monitor the point clouds in real-time during appropriate times—such as take-off and landing times for the helicopter 10—to identify hazardous objects in the vicinity of the helicopter 10. The evaluation module 26 may evaluate the point clouds to detect objects near the tail portion 18 of the helicopter 10 during take-off and landing, for example, such as power lines, trees, buildings, vehicles, persons, etc. In various embodiments, the evaluation module 26 may generate a virtual 3D evidence grid to identify the objects. An example representation of an evidence grid is provided in FIG. 4 for illustrative purposes. The evidence grid represents the 3D space near the helicopter 10 and the grid may be segmented into numerous small, non-overlapping cubes—as small as the resolution of the lidar point data permit—extending in three dimensions. For each cube in the grid, the evaluation module 26 computes, in an ongoing manner, from the point clouds, the likelihood that the cube contains an object. For example, for each cube, the likelihood of a object in the cube can be computed based on the ratio of the number of point clouds where there was an object in the cube over the last T seconds, to the total number of point clouds generated for the space over the last T seconds. In various embodiments, the evaluation module 26 can make the assumption that there is an object in a cube when likelihood meets or exceeds a threshold likelihood level. That way, transient objects, just as dust and leaves that are blown around rapidly when the helicopter takes off and lands are not misclassified as potentially hazardous objects. Also, the size and shape of the object, in three dimensions, can be estimated based on the number of contiguous cubes that exceed the threshold. Further, in a related manner, the evaluation module 26 could also detect a moving object by tracking, and detecting, its movement over time from different time-stamped point clouds. It that connection, the evaluation module 26 could estimate the moving objects' rate of speed and direction of movement. It can also use tracking classification to more evidence of trails left by moving objects.

In an ongoing manner during take-off or landing, while the tail safety system 20 is operative, when objects are detected, the evaluation module 26 can determine whether the objects represent hazards to the tail portion 18 or tail motor 16 of the helicopter 10 based on their distance to the tail portion/motor. Objects within a predefined threshold distance of any part of the tail portion 18, including the tail rotor 16, could be classified as hazards. Moving objects that are not within the threshold distance could also be classified as hazards if their rate of speed and direction of movement is expected to take them within the threshold distance within a threshold period of time (e.g., the moving object is estimated to be within the threshold distance of the tail portion within the next X seconds).

In yet other embodiments, the evaluation module 26 can detect the slope of the ground. This is important for landing the helicopter to make sure that the ground is not sloped too much for landing purposes, and particularly important for autonomous helicopters. To that end, an autonomous helicopter could comprise a landing zone evaluation system and/or a flight planning system, such as described in U.S. provisional patent application Ser. No. 15/152,944, filed May 12, 2016, which is incorporated herein by reference in its entirety. The hazards detected by the evaluation module 26 and/or the ground slope determinations by the evaluation module 26 could be input to the landing zone evaluation system to aid in the evaluation of suitable landing spots for the helicopter, and/or to the flight planning system to aid in updating the flight plan.

In other embodiments, the evaluation module 26 may generate other, different types of probabilistic determinations of objects near the helicopter besides evidence grids, such as structure coherence analysis using, for example, algorithms such as Tensor Voting (see Mordohai, P. & Medioni, "Tensor Voting: A Perceptual Organization Approach to Computer Vision and Machine Learning," Synthesis Lectures on Image, Video, and Multimedia Processing, Vol. 2, pp. 1-136, 2006) or algorithms which recognize arbitrary shapes in the point cloud.

A piloted helicopter 10 with the tail rotor safety system 20 may include a flight crew interface 40 that warns the helicopter's flight crew about any detected hazard. Any suitable interface may be used, such as visual, audible and/or tactile interfaces, as described below. The interface 40 may be located in the cabin or cockpit of the helicopter 10 so that it is accessible to the members of the flight crew, or any other suitable location. For example, the interface 40 could be included on the instrumentation panel of the helicopter's control console. The flight crew interface 40 could be relatively simple, such as lights and/or electroacoustic transducers. The lights may turn on or flash—and/or the electroacoustic transducers could make audible sounds, such as beeps or verbal warnings—when a hazardous object is detected by the evaluation module 26. As such, when the lights flash and/or the audible warning is sounded, the flight crew members will be warned that there is a potentially hazardous object in the vicinity of the tail rotor 16. Alternatively or additionally, the flight crew interface 40 could include a vibrator that vibrates when a hazardous object is detected by the evaluation module 26. In such an embodiment, the vibrator could be included on or with a hand control of the helicopter, such as the cyclic or collective stick, for example.

Figure 5:
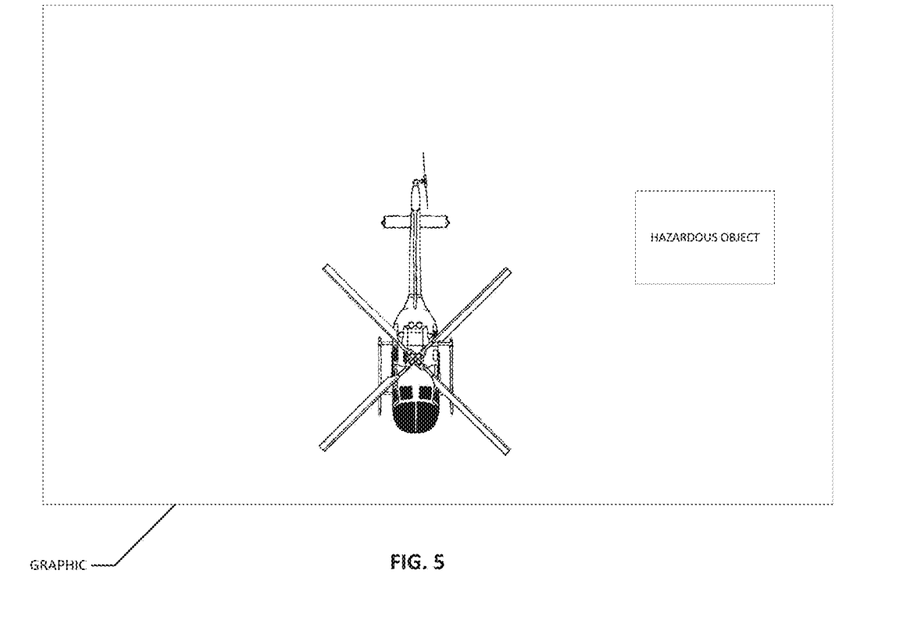
FIGS. 5 to 7 illustrate example graphical interfaces for the helicopter's flight crew according to various embodiments of the present invention.
Figure 6:
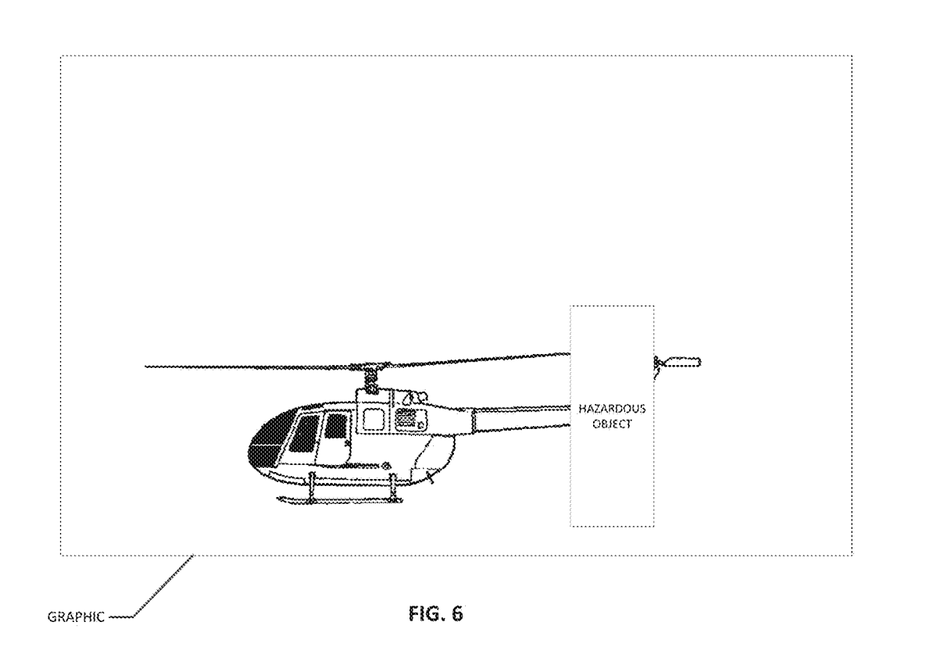
Figure 7:
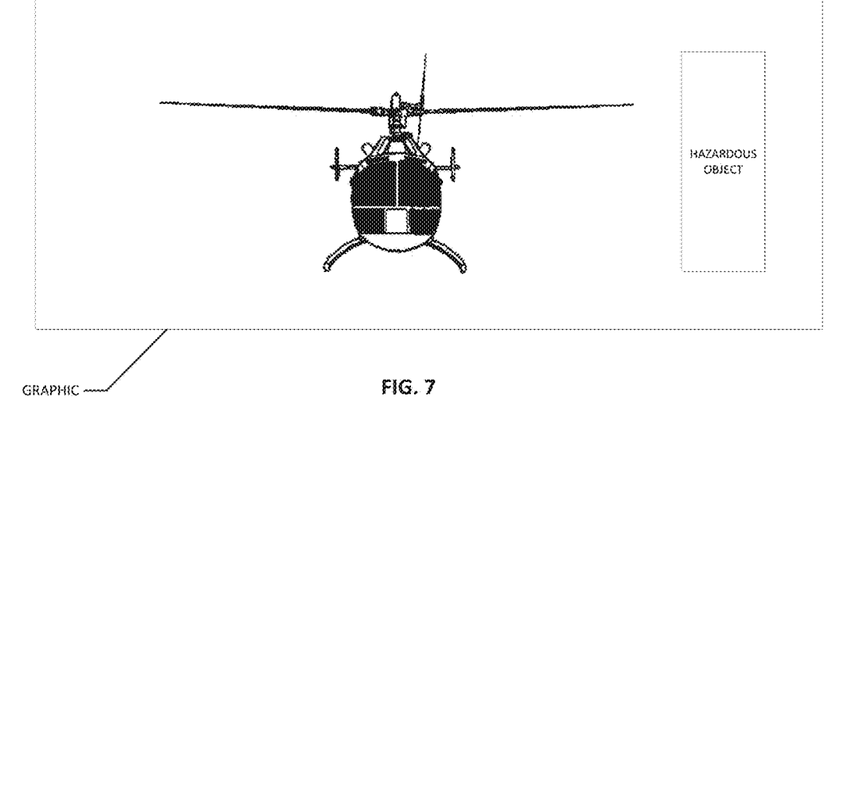

More sophisticated interfaces could also be used (in addition to or in lieu of the lights, electroacoustic transducers, and vibrators described above). For example, in one embodiment, the flight crew interface 40 could comprise a video monitor on the control console of the helicopter 10 or at some other suitable location visible to the flight crew members. In that connection, the display generation module 30 could generate continuously updated graphics depicting, in real-time, objects in the vicinity of the helicopter based on the objects detected by the evaluation module. The graphics may depict the 3D space in the vicinity of the helicopter 10 and may include a representation of the helicopter 10 in the graphics. The continuously updated graphics could be displayed on the video monitor in real time. For example, if an object is twenty feet to the right of the tail rotor, from a perspective looking down on the helicopter, the object could be represented in the graphic by a geometric shape, along with a representation of the helicopter, according to a scale that shows the object twenty feet from the tail rotor in relation to the size of the helicopter in the graphic, such as shown in the example of FIG. 5. The size of the representation of the hazardous object in the graphic could correspond approximately to the size of the object as estimated by the evaluation module. In addition, in various embodiments, the representation of the hazardous object could blink and/or change colors—such as to red—when it is within a threshold distance of the helicopter's tail. Additionally or alternatively, the display generation module 28 could generate side, front and/or review view graphics of the helicopter showing the hazardous object, such as shown in the examples of FIGS. 6 to 7 (side and front views). Other viewing angles could also be used. Further, in various embodiments the flight crew members could select which view to be displayed through an appropriate and suitable input selection means provided by the interface 40.

In other embodiments (in addition to or in lieu of the interfaces described above), the display generation module 40 may combine the hazards detected by the evaluation module 28 with image data captured by the camera system 34 to generate continuously updated, real-time, hybrid, video image/graphical representations of the helicopter and its vicinity. For example, in various embodiments, the camera system 34 could include four wide-field cameras, each pointing from a different side of the helicopter (front, left, right, and rear), that collectively cover the whole space around the helicopter. The display generation module 28 could synthesize the time-stamped images from the cameras, using distortion correction, project transformation, and image fusion, to generate, for example, correspondingly time-stamped views of the helicopter 10 rendered from any synthetic point of view. For example, omniviews (sometimes referred to as surround views or bird views) could be generated that include objects within the viewing range of the cameras (assuming there are such objects). The display generation module 28 could then add a representation of the helicopter 10 in the middle of the omniview, with its corresponding orientation, so that the location of the objects in the omniview relative to the helicopter could be visualized. The combined omniview and helicopter representation could be displayed on the video monitor of the interface 40.

The flight crew interface 40 could include one, several, or all of the above-described interfaces. For example, it could just include the flashing lights; or it could just include an audible beeper; or just the monitor for displaying graphics; etc. Or the interface 40 could combine several of the interfaces and/or include others. To that end, several of the above-described components of the tail rotor safety system 20 could be scaled depending on the cost, weight, and computing power requirements for a particular installation. For example, since GPS systems and camera systems tend to be expensive to install, one or both of them could be omitted in various embodiments. Or the GPS system could be used instead of the IMU for registering the lidar point data if appropriate and desirable for a particular helicopter. Similarly, the on-board computing system could be scaled to achieve a desired combination of weight, cost, speed, and computing power.

As mentioned above, although the present invention is described primarily herein in the context of a tail rotor system, the warning system could also be used for other rotors of the rotorcraft, such as the main rotor.

In various embodiments, the rotor safety system 20 automatically turns on and off based on the altitude of the helicopter 10. For example, the helicopter 10 may include an altitude sensor (not shown), such as an aneroid barometer, radar altimeter, or GPS receiver with altitude capabilities, that senses the altitude of the helicopter above ground. On a landing, the rotor safety system 20 could automatically turn on when the altitude meter senses that the helicopter is within a threshold altitude of the ground surface. Conversely, on take-off, the rotor safety system 20 could automatically turn off when the altitude meter sense that the helicopter has risen above a threshold altitude of the ground surface.

In one general aspect, therefore, the present invention is directed to a helicopter or other type of rotorcraft (piloted or autonomous) with a lidar scanning system for sensing hazards in the vicinity of a rotor of the rotorcraft (e.g., the tail rotor). An on-board computer system is programmed to detect objects in the lidar point data. For a piloted helicopter, the on-board computer system can provide warnings to the flight crew when the detected objects represent hazards to the safety of the helicopter, e.g., when they are within a threshold distance of the rotor as determined from the lidar point data. The interface for the warnings could be as simple as lights or sounds or vibrations, or sophisticated graphics that show the helicopter and the hazardous objects. With autonomous helicopters, the detected hazards can be provided to other systems of the autonomous helicopter, such as a landing zone evaluation system and/or a flight planning system. In various embodiments, the on-board computer system also detects moving objects that potentially present imminent dangers to the helicopter, and can detect complicated structures, such as utility wires from the lidar point data. In addition, in various embodiments, the objects are detected from geo-registered point clouds of the lidar data. The point clouds can be registered with or without GPS coordinate inputs.

In various embodiments, the rotorcraft comprises a rotor, e.g., the tail rotor 16 or the main rotor 14, and a lidar scanner 12 attached to the rotorcraft for continuously scanning a space around the rotor during a near-ground operation of the rotorcraft, such as take-off or landing. The lidar scanner 12 could be attached to the tail portion 18 of the rotorcraft, such as an underside of the tail portion 18. The rotorcraft also comprises a computer system 22 in communication with the lidar scanner 12 for detecting potentially hazardous objects in the vicinity of the rotor during the near-ground operation of the rotorcraft based on time-stamped lidar point data from the lidar scanner 12. The rotorcraft further comprises reaction means that is in communication with the computer system 22 and for taking a reaction in response to detection by the computer system 22 of a potentially hazardous object in the vicinity of the rotor.

In another general aspect, the present invention is directed to a method that comprises the steps of: (i) continuously scanning, by a lidar scanner 12 that is attached to a rotorcraft 10, a space around the rotor during a near-ground operation of the rotorcraft; (ii) detecting, by a computer system 22 that is in communication with the lidar scanner, potentially hazardous objects in the vicinity of the rotor during the near-ground operation of the rotorcraft based on time-stamped lidar point data from the lidar scanner; and (iii) performing a reaction, by a reaction means of the rotorcraft that is in communication with the computer system, in response to detection of a potentially hazardous object in the vicinity of the rotor.

In various implementations, the rotorcraft further comprises an altitude sensor that is in communication with the computer system, in which case the computer system can inactivate the rotor safety system when the rotorcraft is a threshold distance about ground as determined by the altitude sensor. Also, the rotorcraft may comprises at least one motion sensor, such as the IMU 30 and/or the GPS receiver 32, that is in communication with the computer system, in which case the computer system can continuously registers the time-stamped lidar point data from the lidar scanner into a 3D space based on time-stamped position data for the rotorcraft from the at least one motion sensor, such that computer system can then detect potentially hazardous objects in the vicinity of the rotor during the near-ground operation of the rotorcraft based on the time-stamped, registered point data. For example, the computer system can detect potentially hazardous objects in the vicinity of the rotor during the near-ground operation of the rotorcraft by performing steps that comprise: (i) generating a 3D evidence grid representative of the space around the tail, wherein the 3D evidence grid comprises a number of 3D cells, and wherein the 3D evidence grid is continuously updated based on the time-stamped, registered point data; (ii) determining a likelihood that a potentially hazardous object is located in the space corresponding to each 3D cell in an ongoing manner during the near-ground operation based on the registered lidar point data; and (iii) determining that a potentially hazardous object is in one of the cells when the likelihood of a potentially hazardous object in the cell is greater that an threshold likelihood for a threshold period of time.

In various implementations, where rotorcraft is a piloted craft, the reaction means can comprises a flight crew interface that indicates when a potentially hazardous object is detected in the vicinity of the rotor during the near-ground operation. The flight crew interface could be located in a cockpit of the rotorcraft. It could also comprise a video monitor that displays continuously updated graphics of the space around the rail rotor during the near-ground operation, where the computer system generates the continuously updated graphics based on the lidar point data from the lidar scanner. The graphics could comprise a representation of the rotorcraft from a viewing angle. For example, the rotorcraft could additionally comprise at least one camera system pointed at the space around the rotor that is scanned by the lidar scanner, and the graphics generated by the computer system could comprise hybrid video image-graphical representations that combine images from the camera system and graphics generated based on the lidar data. In another embodiment, the rotorcraft could comprise a plurality of wide-field camera systems each pointing from a different side of the rotorcraft, and the graphics generated by the computer system could comprise omniviews of the rotorcraft with a representation of the rotorcraft in the omniviews.

Where the rotorcraft is autonomous, the reaction means may comprise a navigation system that navigates the rotorcraft based on any potentially hazardous objects in the space around the rotor.

In yet another general aspect, the present invention is directed to a rotor safety retrofit kit for retrofitting the rotor safety system to a rotorcraft. The kit may comprise a lidar scanner for attachment to the rotorcraft such that, when attached, the lidar scanner is for continuously scanning a space around the rotor during a near-ground operation of the rotorcraft. The kit may also comprise computer software for execution by a computer system of the rotorcraft. Execution of the computer software by the computer system causes the computer system to: (i) detect potentially hazardous objects in the vicinity of the rotor during the near-ground operation of the rotorcraft based on time-stamped lidar point data from the lidar scanner; and (ii) generate continuously updated graphics of the space around the rail rotor during the near-ground operation based on the lidar point data from the lidar scanner, wherein the graphic are for display by a flight crew interface of the rotorcraft.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. Those of ordinary skill in the art will recognize that a sufficient understanding of the present invention can be gained by the present disclosure, and therefore, a more detailed description of such elements is not provided herein.

The modules of the tail rotor safety system's on-board computer 22 may be implemented as software modules stored in the primary memory and that are executed by the processor(s) of the on-board computer 22. The modules and other computer functions described herein may be implemented in computer software using any suitable computer programming language such as .NET, SQL, MySQL, HTML, C, C++, Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal, Haskell, ML; and examples of scripting languages include Bourne script, JavaScript, Python, Ruby, Lua, PHP, and Perl. Such software may be stored on any type of suitable computer-readable medium or media such as, for example, solid state, magnetic or optical storage medium.

Reference to "one embodiment" or "an embodiment" means that a particular feature, structure, or characteristic described in connection with the embodiment is comprised in at least one embodiment. The appearances of the phrase "in one embodiment" or "in one aspect" in the specification are not necessarily all referring to the same embodiment.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A rotorcraft comprising:
   a rotor; and
   a rotor safety system that comprises:
   a lidar scanner attached to the rotorcraft for continuously scanning a space around the rotor during a near-ground operation of the rotorcraft;
   a computer system in communication with the lidar scanner for detecting objects that pose a threat of contacting the rotor during the near-ground operation of the rotorcraft based on time-stamped lidar point data from the lidar scanner, wherein the computer system detects whether an object poses a threat of contacting the rotor by:
   generating a series of time-stamped point clouds from the time-stamped lidar point data, wherein the series of time-stamped point clouds indicate a location of the object in a vicinity of the rotor at different time stamp instances;
   determining a relative velocity of the object relative to the rotor based on movement of the object relative to the rotor over the series of time-stamped point clouds; and
   determining, based on the determined relative velocity of object, that the object poses a threat of contacting the rotor when it is determined that the object will be within a threshold distance of the rotor within a threshold time period; and
   reaction means in communication with the computer system for taking a reaction in response to detection by the computer system that the object poses a threat of contacting the rotor.

2. The rotorcraft of claim 1, wherein the near-ground operation comprises take-off or landing of the rotorcraft.

3. The rotorcraft of claim 1, wherein the rotor comprises a tail rotor of the rotorcraft.

4. The rotorcraft of claim 3, wherein the lidar scanner is attached to a tail portion of the rotorcraft.

5. The rotorcraft of claim 4, wherein the lidar scanner is attached to an underside of the tail portion.

6. The rotorcraft of claim 1, wherein:
   the rotorcraft further comprises an altitude sensor;
   the computer system is in communication with the altitude sensor; and
   the computer system inactivates the rotor safety system when the rotorcraft is a threshold distance above ground as determined by the altitude sensor.

7. The rotorcraft of claim 6, wherein:
   the rotorcraft comprises at least one motion sensor that is in communication with the computer system; and
   the computer system continuously registers the time-stamped point clouds into a three-dimensional space based on time-stamped position data for the rotorcraft from the at least one motion sensor.

8. The rotorcraft of claim 7, wherein the computer system detects objects that pose a threat of contacting the rotor during the near-ground operation of the rotorcraft by performing steps that comprise:
   generating a three-dimensional evidence grid representative of the space around the rotor, wherein the three-dimensional evidence grid comprises a number of three-dimensional cells, and wherein the three-dimensional evidence grid is continuously updated based on the time-stamped, registered point data;
   determining a likelihood that a potentially hazardous object is located in the space corresponding to each three-dimensional cell in an ongoing manner during the near-ground operation based on the registered lidar point data; and
   determining that a potentially hazardous object is in one of the cells when the likelihood of a potentially hazardous object in the cell is greater that a threshold likelihood for a threshold period of time.

9. The rotorcraft of claim 8, wherein the at least one motion sensor comprises an IMU.

10. The rotorcraft of claim 8, wherein the at least one motion sensor comprises an IMU and a GPS system.

11. The rotorcraft of claim 1, wherein:
the rotorcraft comprises a piloted rotorcraft; and
the reaction means comprises a flight crew interface that indicates when a potentially hazardous object is detected in the vicinity of the rotor during the near-ground operation.

12. The rotorcraft of claim 11, wherein the flight crew interface is located in a cockpit of the rotorcraft.

13. The rotorcraft of claim 11, wherein the flight crew interface comprises a warning system selected from the group consisting of:
at least one electroacoustic transducer that emits sound when a potentially hazardous object is detected in the vicinity of the rotor during the near-ground operation;
at least one light source that emits light when a potentially hazardous object is detected in the vicinity of the rotor during the near-ground operation; and
at least one vibrator that vibrates when a potentially hazardous object is detected in the vicinity of the rotor during the near-ground operation.

14. The rotorcraft of claim 11, wherein:
the flight crew interface comprises a video monitor that displays continuously updated graphics of the space around the rail rotor during the near-ground operation; and
the computer system generates the continuously updated graphics based on the lidar point data from the lidar scanner.

15. The rotorcraft of claim 14, wherein the graphics comprise a representation of the rotorcraft from a viewing angle.

16. The rotorcraft of claim 14, wherein:
the rotorcraft comprises at least one camera system pointed at the space around the rotor that is scanned by the lidar scanner; and
the graphics generated by the computer system comprise hybrid video image-graphical representations that combine images from the camera system and graphics generated based on the lidar data.

17. The rotorcraft of claim 14 wherein:
the rotorcraft comprises a plurality wide-field camera systems each pointing from a different side of the rotorcraft;
the plurality of wide-field cameras are in communication with the computer system; and
the graphics generated by the computer system comprise omniviews of the rotorcraft with a representation of the rotorcraft in the omniviews.

18. The rotorcraft of claim 1, wherein:
the rotorcraft comprises an autonomous rotorcraft; and
the reaction means comprises a navigation system that navigates the rotorcraft based on any potentially hazardous objects in the space around the rotor.

19. The rotorcraft of claim 1, wherein the computer system additional determines that an object poses a threat of contacting the rotor when, based on the time-stamped point clouds, the computer system determines that a non-moving object is within a threshold distance of the rotor.

20. A method comprising:
continuously scanning, by a lidar scanner that is attached to a rotorcraft, a space around the rotor during a near-ground operation of the rotorcraft;
detecting, by a rotor safety system that comprises a computer system that is in communication with the lidar scanner, objects that pose a threat of contacting the rotor during the near-ground operation of the rotorcraft based on time-stamped lidar point data from the lidar scanner, wherein detecting whether an object poses a threat of contacting the rotor comprises;
generating, by the computer system, a series of time-stamped point clouds from the time-stamped lidar point data, wherein the series of time-stamped point clouds indicate locations of the object in a vicinity of the rotor at different time stamp instances;
determining, by the computer system, a relative velocity of the object relative to the rotor based on movement of the object relative to the rotor over the series of time-stamped point clouds; and
determining, by the computer system, based on the determined relative velocity of object, that the object poses a threat of contacting the rotor when it is determined that the object will be within a threshold distance of the rotor within a threshold time period; and
performing a reaction, by a reaction means of the rotorcraft that is in communication with the computer system, in response to detection of a potentially hazardous object in the vicinity of the rotor.

21. The method of claim 20, wherein:
the rotorcraft further comprises an altitude sensor that is in communication with the computer system; and
the method further comprises inactivating, by the computer system, the rotor safety system when the rotorcraft is a threshold distance about ground as determined by the altitude sensor.

22. The method of claim 21, wherein:
the rotorcraft comprises at least one motion sensor that is in communication with the computer system;
the step of detecting potentially hazardous objects comprises:
continuously registering, by the computer system, the time-stamped lidar point data from the lidar scanner into a three-dimensional space based on time-stamped position data for the rotorcraft from the at least one motion sensor; and
detecting, by the computer system, potentially hazardous objects in the vicinity of the rotor during the near-ground operation of the rotorcraft based on the time-stamped, registered point data.

23. The method of claim 22, wherein the step of detecting potentially hazardous objects in the vicinity of the rotor during the near-ground operation of the rotorcraft further comprises, by the computer system:
generating a three-dimensional evidence grid representative of the space around the rotor, wherein the three-dimensional evidence grid comprises a number of three-dimensional cells, and wherein the three-dimensional evidence grid is continuously updated based on the time-stamped, registered point data;
determining a likelihood that a potentially hazardous object is located in the space corresponding to each three-dimensional cell in an ongoing manner during the near-ground operation based on the registered lidar point data; and determining that a potentially hazardous object is in one of the cells when the likelihood of a potentially hazardous object in the cell is greater that a threshold likelihood for a threshold period of time.

24. The method of claim 20, wherein:
the rotorcraft comprises a piloted rotorcraft; and
the reaction means comprises a flight crew interface that indicates when a potentially hazardous object is detected in the vicinity of the rotor during the near-ground operation.

25. The method of claim 20, wherein:
the rotorcraft comprises an autonomous rotorcraft; and
the reaction means comprises a navigation system that navigates the rotorcraft based on any potentially hazardous objects in the space around the rotor.

26. A rotor safety retrofit kit for a rotorcraft, the kit comprising:
a lidar scanner for attachment to the rotorcraft such that, when attached, the lidar scanner is for continuously scanning a space around the rotor during a near-ground operation of the rotorcraft;
computer software for execution by a computer system of the rotorcraft, wherein execution of the computer software by the computer system cause the computer system to:
detect objects that poses a threat of contacting the rotor during the near-ground operation of the rotorcraft based on time-stamped lidar point data from the lidar scanner, wherein the computer software configures the computer system to detect whether an object poses a threat of contacting the rotor by;
generating a series of time-stamped point clouds from the time-stamped lidar point data, wherein the series of time-stamped point clouds indicate locations of the object in a vicinity of the rotor at different time stamp instances;
determining a relative velocity of the object relative to the rotor based on movement of the object relative to the rotor over the series of time-stamped point clouds; and
determining, based on the determined relative velocity of object, that the object poses a threat of contacting the rotor when it is determined that the object will be within a threshold distance of the rotor within a threshold time period; and
generate continuously updated graphics of the space around the rail rotor during the near-ground operation based on the lidar point data from the lidar scanner, wherein the graphic are for display by a flight crew interface of the rotorcraft.

* * * * *